United States Patent [19]

Prochaska, Sr., John J. et al.

[11] Patent Number: 5,069,023

[45] Date of Patent: Dec. 3, 1991

[54] AQUATIC VEGETATION HARVESTER

[75] Inventors: Prochaska, Sr., John J.; Joseph M. Wright, both of Fenton, Mich.

[73] Assignee: Modtech Industries, Inc., Flint, Mich.

[21] Appl. No.: 543,092

[22] Filed: Jun. 25, 1990

[51] Int. Cl.⁵ ............................................. A01D 44/00
[52] U.S. Cl. ............................................. 56/9; 440/91
[58] Field of Search ............... 56/8, 9; 440/90, 91, 440/53

[56] References Cited

U.S. PATENT DOCUMENTS

| | | | |
|---|---|---|---|
| 3,449,892 | 6/1969 | Hutt | 56/9 |
| 3,468,106 | 9/1969 | Myers et al. | 440/91 X |
| 3,653,192 | 4/1972 | Bryant | 56/9 X |
| 4,248,033 | 2/1981 | Bryant | 56/8 |
| 4,942,722 | 7/1990 | Desrosiers | 56/8 |

FOREIGN PATENT DOCUMENTS 1076369  4/1980  Canada ..................... 56/9

Primary Examiner—William P. Neuder
Attorney, Agent, or Firm—Lyon & Delevie

[57] ABSTRACT

An aquatic vegetation harvester comprises a barge having a vegetation cutter extending forwardly thereof and a conveyor extending aft. Hydraulic cylinders effect elevation of the aft end of the conveyor relative to the barge. A pair of laterally spaced, laterally adjustable paddle wheels on the sides of the barge effect propulsion thereof.

2 Claims, 1 Drawing Sheet

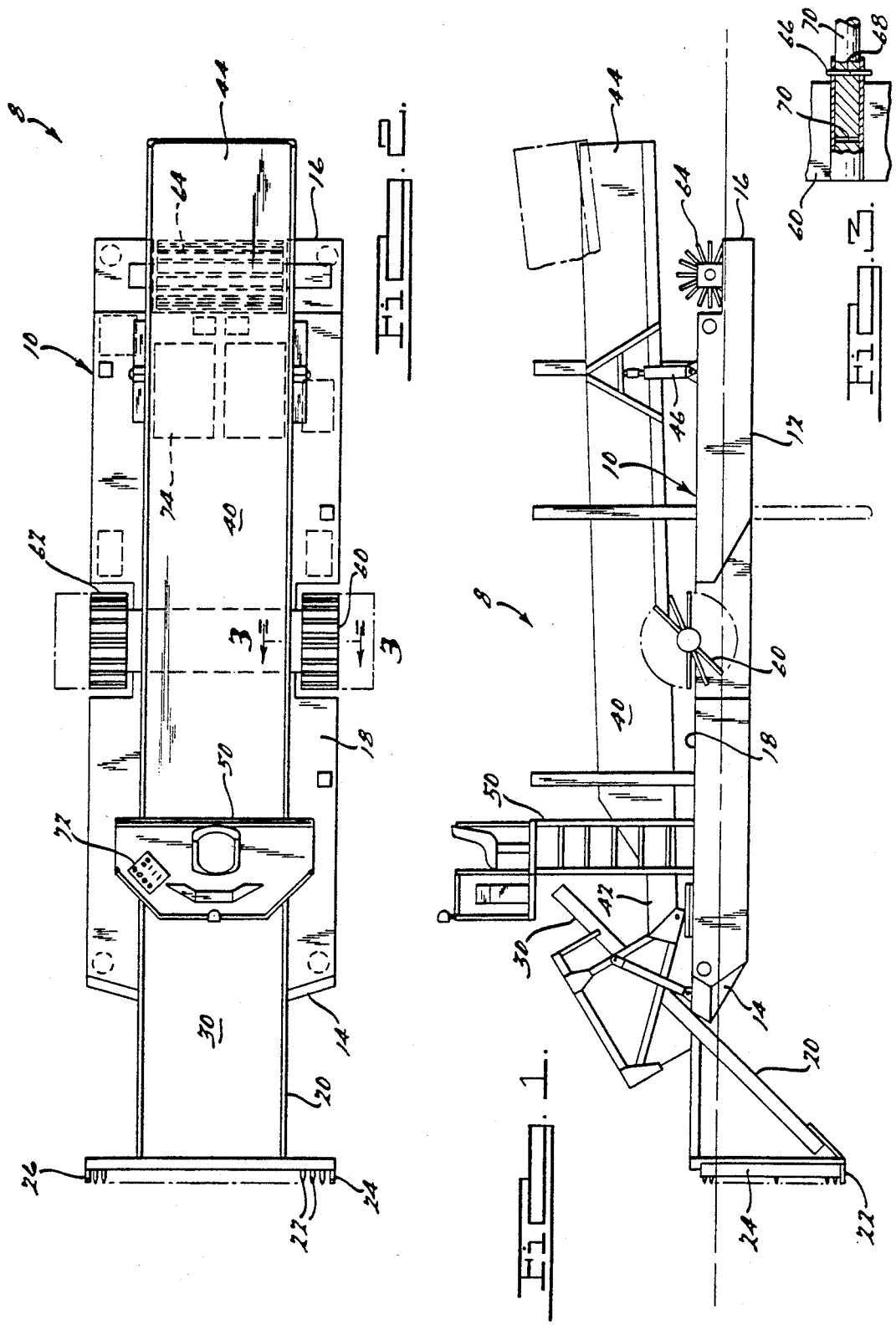

AQUATIC VEGETATION HARVESTER

BACKGROUND OF THE INVENTION

The invention relates to an improved aquatic vegetation harvester for cutting and removing aquatic vegetation from lakes, rivers, ponds, etc. Such apparatus generally comprises a barge for the support of cutters and a conveyor that extends from adjacent the cutters to either a transport barge or to shore for discharge of the vegetation. Such machines are taught in U.S. Pat. Nos. 3,688,478; 3,653,192; 4,258,534 and 4,248,033.

The aquatic harvesters disclosed in the aforesaid patents exhibit several problems. Specifically, propulsion systems of known harvesters either are contained within wells along the sides of the barge thereby reducing propulsion efficiency, or extend laterally of the barge thereby compromising over-the-road transport of the harvester. Moreover, transport of vegetation from the cutters has heretofore been complicated by the use of fixed conveyors.

SUMMARY OF THE INVENTION

The aquatic vegetation harvester of the present invention solves the aforesaid problems. The harvester comprises a barge having a forwardly disposed cutter assembly comprising vertical side cutters and a lower horizontal cutter. The cutters are supported on a vertically adjustable frame which, in combination with a cutter conveyor, form a vegetation cutting, collection and transport throat. A second vertically adjustable cut vegetation conveyor extends aft of the cutter conveyor to convey the cut vegetation above the barge to a collection and/or transport container.

The barge is propelled by three paddle wheels, two of which are located on the sides of the barge to avoid interference with the vegetation conveyor. The side mounted paddle wheels extend laterally of the barge to maximize efficiency thereof but are laterally retractable for over-the-road travel.

BRIEF DESCRIPTION OF THE DRAWINGS

FIG. 1 is a side-elevational view of an aquatic vegetation harvester in accordance with the invention.
FIG. 2 is a top view of the harvester of FIG. 1.
FIG. 3 is a view taken along the line 3—3 of FIG. 1.

DETAILED DESCRIPTION OF THE PREFERRED EMBODIMENT OF THE INVENTION

A aquatic vegetation harvester 8 comprises a barge 10 having a conventional bottom 12, V-shaped stem 14, transom 16 and deck 18.

A weed cutter support frame 20 is mounted on the deck 18 just aft of the stem 14 and comprises a horizontal cutter 22 and laterally spaced vertically extending cutters 24 and 26. The cutters 22, 24 and 26 in combination with a cutter conveyor 30 form a collection throat for transmission of cut vegetation aft of the harvester 8.

A cut vegetation conveyor 40 has a front end portion 42 that underlies the cutter conveyor 30 to accept cut vegetation for transport aft of the barge 10. An aft discharge end 44 of the conveyor 40 can be elevated as by hydraulic cylinders 46, one of which is shown, to accommodate collector barges, shorelines, or docks (not shown) of different height.

As best seen in FIG. 1, a control tower 50 is elevated above the deck 18 of the barge 10 to provide optimum visability for an operator and to facilitiate movement of cut vegetation aft of the barge 10 on the conveyor 40. All controls of the harvester 8 are hydraulic to simplify control thereof from the tower 50.

In accordance with one feature of the present invention, propulsion of the harvester 8 through the water is achieved by three paddle wheels 60, 62 and 64 which facilitate movement of the harvester 8 in relatively shallow water. The use of side mounted paddle wheels 60 and 62 eliminates any possible interference with the conveyor 40. Efficiency of the paddle wheels 60 and 62 for through the water propulsion is maximized by extension thereof laterally to the dotted line position shown in FIG. 1. The wheels 60 and 62 are retractable from said extended operating position shown in dotted lines in FIG. 2 to a retractable position for over-the-road travel, as shown in solid lines of FIG. 2. Adjustment of the position of the wheels 60 and 62 is effected by placement of a pin 66 in selected holes 68 or 70 in a drive shaft 72.

As best seen in FIG. 1 of the drawings, control of the harvester 8 is effected by a plurality of hydraulic valves that are mounted on the control tower 50. The hydraulic controls 72 are connected to a diesel engine 74 that is housed between the bottom 12 and the deck 18 of the barge 10. The hydraulic controls also effect control of the hydraulic cylinders 46 of the vegetation conveyor 40 thereby to vertically position the aft end of the conveyor 40. It is noted that the accessories necessary to operation of the diesel engine 74 and all systems of the harvester 8 are located internally of the barge 8 so as to maintain the deck 18 thereof free of clutter.

While the preferred embodiment of the invention has been disclosed, it should be appreciated that the invention is susceptible of modification without departing from the scope of the following claims.

I claim:
1. An aquatic vegetation harvester comprising
   a barge having a stem, a stern and a generally rectangular deck;
   a vegetation cutter extending forwardly of the stem of said barge;
   a cutter conveyor extending aft of said vegetation cutter;
   a cut vegetation conveyor extending aft of said cutter conveyor; and
   means for propelling said barge through the water comprising a pair of spaced paddle wheels extendable laterally of the rectangular cross-section of the deck of said barge for in-the-water propulsion and retractable within the rectangular cross-section of the deck of said barge for over-the-road transportation.
2. The harvester of claim 1 comprising a third paddle wheel at the transom of said barge underlying said cut vegetation conveyor.

* * * * *